United States Patent
Kim et al.

(10) Patent No.: US 12,083,863 B2
(45) Date of Patent: Sep. 10, 2024

(54) METHOD FOR CONTROLLING HEATING OF VEHICLE THERMAL MANAGEMENT SYSTEM

(71) Applicants: Hyundai Motor Company, Seoul (KR); Kia Corporation, Seoul (KR)

(72) Inventors: Tae Han Kim, Seoul (KR); Jae Hyun Song, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 228 days.

(21) Appl. No.: 17/515,743

(22) Filed: Nov. 1, 2021

(65) Prior Publication Data
US 2022/0324295 A1 Oct. 13, 2022

(30) Foreign Application Priority Data
Apr. 8, 2021 (KR) .................. 10-2021-0046142

(51) Int. Cl.
*B60H 1/32* (2006.01)
*B60H 1/00* (2006.01)
(52) U.S. Cl.
CPC ........ *B60H 1/3205* (2013.01); *B60H 1/00485* (2013.01); *B60H 2001/3255* (2013.01); *B60H 2001/3272* (2013.01); *B60H 2001/3285* (2013.01)
(58) Field of Classification Search
CPC .... B60H 1/00821; B60H 1/828; B60H 1/835; B60H 1/864; B60H 1/871; B60H 2001/3285
See application file for complete search history.

(56) References Cited

U.S. PATENT DOCUMENTS

2019/0322158 A1* 10/2019 Chevers ............... B60H 1/3208

FOREIGN PATENT DOCUMENTS

WO    WO-2014115509 A1 *  7/2014 ......... B60H 1/00885

\* cited by examiner

*Primary Examiner* — Nelson J Nieves
*Assistant Examiner* — Meraj A Shaikh
(74) *Attorney, Agent, or Firm* — MORGAN, LEWIS & BOCKIUS LLP (57) ABSTRACT

A method for controlling heating of a vehicle thermal management system including an HVAC subsystem may include: determining, by a controller, a target temperature for heating a passenger compartment of a vehicle when the HVAC subsystem operates in heating mode; determining, by the controller, whether an internal temperature of the passenger compartment is lower than the target temperature; adjusting, by the controller, an opening amount of a heating-side expansion valve of the HVAC subsystem to a first opening amount and opening the heating-side expansion valve when the internal temperature is lower than the desired target temperature; and decreasing, by the controller, RPM of a compressor of the HVAC subsystem when the internal temperature is higher than or equal to the desired target temperature. The first opening amount is an opening amount of the heating-side expansion valve with which a heat capacity generated by a heating operation of the HVAC subsystem reaches a maximum heat capacity.

9 Claims, 7 Drawing Sheets

METHOD FOR CONTROLLING HEATING OF VEHICLE THERMAL MANAGEMENT SYSTEM

CROSS-REFERENCE TO RELATED APPLICATION

The present application claims priority to Korean Patent Application No. 10-2021-0046142, filed on Apr. 8, 2021, the entire contents of which is incorporated herein for all purposes by this reference.

BACKGROUND OF THE INVENTION

Field of the Invention

The present invention relates to a method for controlling heating of a vehicle thermal management system, and more particularly, to a method for controlling heating of a vehicle thermal management system capable of keeping a temperature of a passenger compartment constant at a desired target temperature after the temperature of the passenger compartment reaches the desired target temperature during the heating of the passenger compartment.

Description of Related Art

With a growing interest in energy efficiency and environmental issues, there is a demand for development of eco-friendly vehicles that can replace internal combustion engine vehicles. Such eco-friendly vehicles include electric vehicles which are driven by use of fuel cells or electricity as a power source and hybrid vehicles which are driven by use of an engine and a battery system.

Existing electric vehicles and hybrid vehicles have employed an air-cooled battery cooling system using interior cold air. In recent years, research is underway on a water-cooled battery cooling system that cools the battery by water cooling to extend all electric range (AER) to 300 km (200 miles) or more. Energy density may be increased by adopting a structure that cools the battery in a water-cooled manner using a heating, ventilation, and air conditioning (HVAC) system, a radiator, and the like. Furthermore, the water-cooled battery cooling system may make the battery system compact by reducing gaps between battery cells, and improve battery performance and durability by maintaining a uniform temperature between the battery cells.

To implement the above-described water-cooled battery cooling system, research is being conducted on a vehicle thermal management system integrated with a powertrain cooling subsystem for cooling an electric motor and electric/electronic components, a battery cooling subsystem for cooling a battery, and a heating, ventilation, and air conditioning (HVAC) subsystem for heating or cooling air in a passenger compartment.

The HVAC subsystem includes a refrigerant loop fluidly connected to an evaporator, a compressor, a condenser, and an expansion valve located on the upstream side of the evaporator, and a refrigerant may circulate through the refrigerant loop.

The powertrain cooling subsystem includes a powertrain coolant loop fluidly connected to the electric/electronic components (an electric motor, an inverter, etc.), and a coolant may circulate through the powertrain coolant loop. The coolant circulating through the powertrain coolant loop may be cooled by a radiator.

The battery cooling subsystem includes a battery coolant loop fluidly connected to the battery and a battery chiller, and the coolant may circulate through the battery coolant loop. The battery chiller may be configured to transfer heat between a branch line branching off from the refrigerant loop and the battery coolant loop. In the battery chiller, the coolant cooled by the refrigerant may cool the battery.

As the HVAC subsystem operates in a heating mode for heating the passenger compartment, the heated air may be delivered from the HVAC subsystem to the passenger compartment, increasing the temperature of the passenger compartment. When the HVAC subsystem operates in the heating mode, a controller may set a target temperature DTT that give comfort to occupants. When the temperature of the passenger compartment exceeds the target temperature after reaching the target temperature by the heating operation of the HVAC subsystem, the comfort of the passenger compartment may be relatively reduced.

To cope with this, when the temperature of the passenger compartment exceeds the target temperature during the heating operation of the HVAC subsystem, the compressor of the HVAC subsystem may be deactivated to lower the temperature of the passenger compartment. Thereafter, when the temperature of the passenger compartment becomes lower than the target temperature, the compressor may be activated again so that the temperature of the passenger compartment rises to the target temperature.

As described above, according to the related art, the compressor may be repeatedly activated and deactivated during the heating operation of the HVAC subsystem so that the temperature of the passenger compartment may be kept at the target temperature. As a result, the temperature of the passenger compartment may change and noise may be generated due to the repeated activation and deactivation of the compressor, which may degrade the comfort of the passenger compartment.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for controlling heating of a vehicle thermal management system configured for keeping a temperature of a passenger compartment constant at a desired target temperature after the temperature of the passenger compartment reaches the desired target temperature during the heating of the passenger compartment.

According to various aspects of the present invention, a method for controlling heating of a vehicle thermal management system including a heating, ventilation, and air conditioning (HVAC) subsystem may include: determining, by a controller, a target temperature for heating a passenger compartment of a vehicle when the HVAC subsystem operates in a heating mode; determining, by the controller, whether an internal temperature of the passenger compartment is lower than the target temperature; adjusting, by the controller, an opening amount of a heating-side expansion valve of the HVAC subsystem to a first opening amount and opening the heating-side expansion valve when the internal temperature is lower than the desired target temperature; and decreasing, by the controller, RPM of a compressor of the HVAC subsystem when the internal temperature is higher than or equal to the desired target temperature, wherein the first opening amount may be an opening amount of the heating-side expansion valve with which a heat capacity generated by a heating operation of the HVAC subsystem reaches a maximum heat capacity.

The method may further include increasing, by the controller, the RPM of the compressor of the HVAC subsystem while maintaining the first opening amount of the heating-side expansion valve when the internal temperature is lower than the desired target temperature.

According to various exemplary embodiments of the present invention, the method may further include increasing, by the controller, the opening amount of the heating-side expansion valve when the RPM of the compressor reaches a minimum RPM. The method may further include increasing, by the controller, the opening amount of the heating-side expansion valve to a second opening amount greater than the first opening amount. The method may further include maintaining, by the controller, the second opening amount of the heating-side expansion valve when the internal temperature is equal to the desired target temperature.

The method may further include moving, by the controller, an air mixing door from a full heating position to a mix position when the RPM of the compressor increases to a maximum RPM. The method may further include returning, by the controller, the air mixing door from the mix position to the full heating position when the RPM of the compressor decreases to a minimum RPM. The full heating position may be a position in which all air heated by the HVAC subsystem is directed into the passenger compartment, and the mix position may be a position in which the internal temperature is reduced to the desired target temperature by lowering a temperature of air flowing from the HVAC subsystem to the passenger compartment.

According to various exemplary embodiments of the present invention, the method may further include moving, by the controller, an air mixing door from a full heating position to a mix position while decreasing the RPM of the compressor when the internal temperature is higher than or equal to the desired target temperature. The method may further include keeping, by the controller, the air mixing door in the mix position when the RPM of the compressor reaches a minimum RPM, and maintaining the minimum RPM of the compressor.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. In the drawings, the same reference numerals will be used throughout to designate the same or equivalent elements. Furthermore, a detailed description of well-known techniques associated with the present invention will be ruled out in order not to unnecessarily obscure the gist of the present invention.

Terms such as first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which various exemplary embodiments of the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

In the present description, a heat capacity is defined as the amount of heat that an internal condenser in a heating, ventilation, and air conditioning (HVAC) subsystem provides to a passenger compartment when the HVAC system operates in a heating mode.

Figure 1:
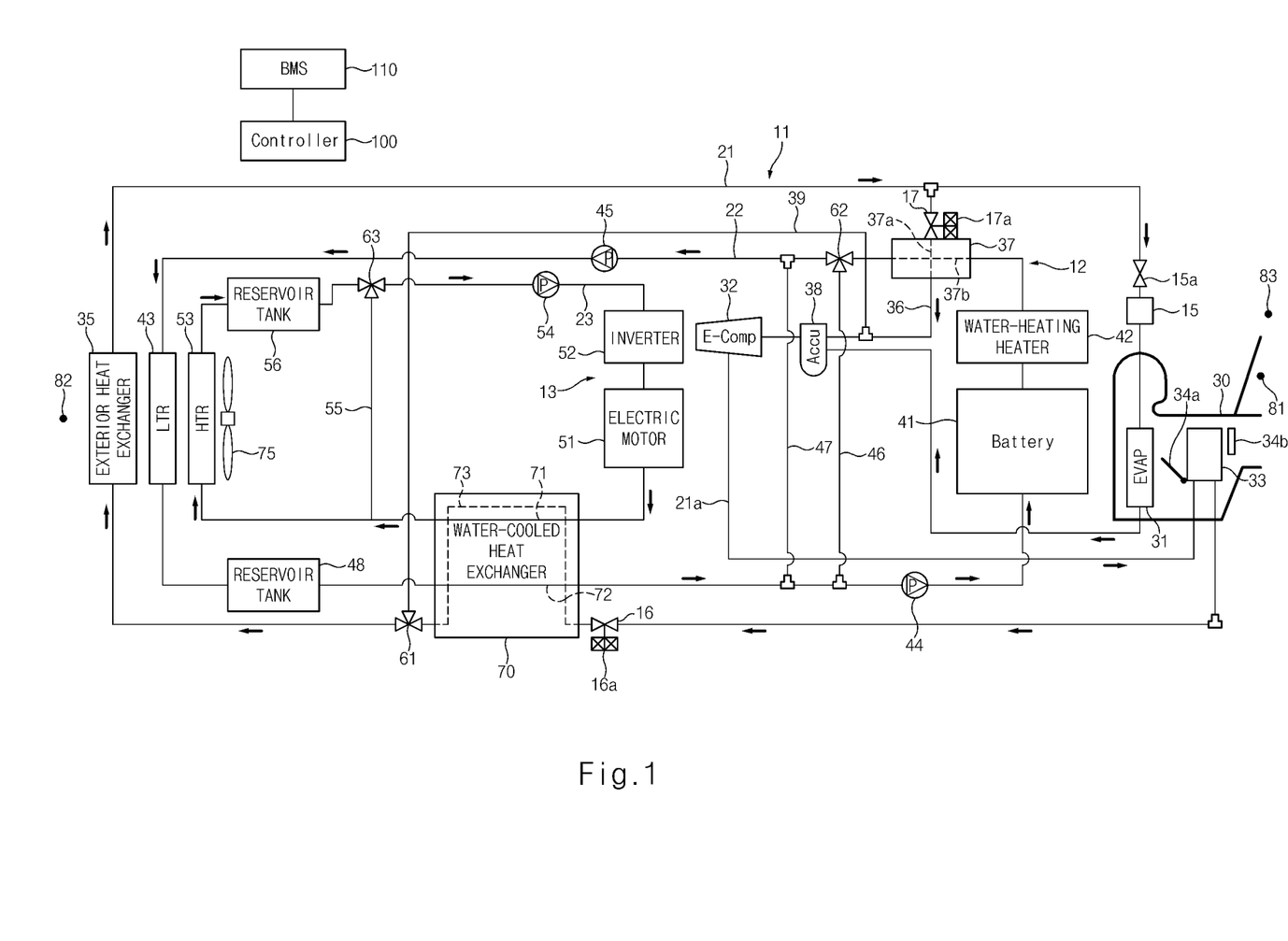
FIG. 1 illustrates a vehicle thermal management system according to various exemplary embodiments of the present invention.

Referring to FIG. 1, a vehicle thermal management system according to various exemplary embodiments of the present invention may include a heating, ventilation, and air conditioning (HVAC) subsystem 11 including a refrigerant loop 21 through which a refrigerant circulates, a battery cooling subsystem 12 including a battery coolant loop 22 through which a coolant for cooling a battery pack 41 circulates, and a powertrain cooling subsystem 13 including a powertrain coolant loop 23 through which a coolant for cooling an electric motor 51 and electric/electronic components 52 of a powertrain circulates.

The HVAC subsystem 11 may be configured to heat or cool air in the passenger compartment of the vehicle using the refrigerant circulating in the refrigerant loop 21. The refrigerant loop 21 may be fluidly connected to an evaporator 31, a compressor 32, an internal condenser 33, a heating-side expansion valve 16, a water-cooled heat exchanger 70, an external heat exchanger 35, and a cooling-side expansion valve 15. In FIG. 1, the refrigerant may sequentially pass through the compressor 32, the internal condenser 33, the heating-side expansion valve 16, the water-cooled heat exchanger 70, the external heat exchanger 35, the cooling-side expansion valve 15, and the evaporator 31 through the refrigerant loop 21.

The evaporator 31 may be configured to evaporate the refrigerant received from the cooling-side expansion valve 15. That is, the refrigerant expanded by the cooling-side expansion valve 15 may be evaporated by absorbing heat from the air in the evaporator 31. During a cooling operation of the HVAC subsystem 11, the evaporator 31 may be configured to cool the air directed into the passenger compartment using the refrigerant cooled by the external heat exchanger 35 and expanded by the cooling-side expansion valve 15.

The compressor 32 may be configured to compress the refrigerant received from the evaporator 31 and/or a battery chiller 37. According to various exemplary embodiments of the present invention, the compressor 32 may be an electric compressor which is driven by electrical energy.

The internal condenser 33 may be configured to condense the refrigerant received from the compressor 32 through a conduit 21a, and accordingly the air passing through the internal condenser 33 may be heated by the internal condenser 33. As the air heated by the internal condenser 33 is directed into the passenger compartment, the passenger compartment may be heated.

The external heat exchanger 35 may be disposed adjacent to a front grille of the vehicle. Since the external heat exchanger 35 is exposed to the outside, heat may be transferred between the external heat exchanger 35 and the ambient air. During the cooling operation of the HVAC subsystem 11, the external heat exchanger 35 may be configured to condense the refrigerant received from the internal condenser 33. That is, the external heat exchanger 35 is configured as an external condenser that condenses the refrigerant by transferring heat to the ambient air during the cooling operation of the HVAC subsystem 11. During a heating operation of the HVAC subsystem 11, the external heat exchanger 35 may be configured to evaporate the refrigerant received from the water-cooled heat exchanger 70. That is, the external heat exchanger 35 is configured as an external evaporator that evaporates the refrigerant by absorbing heat from the ambient air during the heating operation of the HVAC subsystem 11. The external heat exchanger 35 may exchange heat with the ambient air forcibly blown by a cooling fan 75 so that a heat transfer rate between the external heat exchanger 35 and the ambient air may be further increased.

The water-cooled heat exchanger 70 may transfer heat among the refrigerant loop 21 of the HVAC subsystem 11, the battery coolant loop 22 of the battery cooling subsystem 12, and the powertrain coolant loop 23 of the powertrain cooling subsystem 13. The water-cooled heat exchanger 70 may be disposed between the internal condenser 33 and the external heat exchanger 35 in the refrigerant loop 21. The water-cooled heat exchanger 70 may include a first passage 71 fluidly connected to the powertrain coolant loop 23, a second passage 72 fluidly connected to the battery coolant loop 22, and a third passage 73 fluidly connected to the refrigerant loop 21.

During the heating operation of the HVAC subsystem 11, the water-cooled heat exchanger 70 may be configured to evaporate the refrigerant which is received from the internal condenser 33 using heat which is transferred from the powertrain cooling subsystem 13. That is, during the heating operation of the HVAC subsystem 11, the water-cooled heat exchanger 70 is configured as an evaporator that evaporates the refrigerant by recovering waste heat from the electric motor 51 and the electric/electronic components 52 of the powertrain cooling subsystem 13.

During the cooling operation of the HVAC subsystem 11, the water-cooled heat exchanger 70 may be configured to condense the refrigerant received from the internal condenser 33. The water-cooled heat exchanger 70 is configured as a condenser that condenses the refrigerant by cooling the refrigerant using the battery coolant circulating in the battery coolant loop 22 of the battery cooling subsystem 12 and the powertrain coolant circulating in the powertrain coolant loop 23 of the powertrain cooling subsystem 13.

The heating-side expansion valve 16 may be located on the upstream side of the water-cooled heat exchanger 70 in the refrigerant loop 21. The heating-side expansion valve 16 may be disposed between the internal condenser 33 and the water-cooled heat exchanger 70. During the heating operation the HVAC subsystem 11, the heating-side expansion valve 16 may adjust the flow direction thereof, flow rate, and the like of the refrigerant directed toward the water-cooled heat exchanger 70. The heating-side expansion valve 16 may be configured to expand the refrigerant received from the internal condenser 33 during the heating operation the HVAC subsystem 11.

According to various exemplary embodiments of the present invention, the heating-side expansion valve 16 may be an electronic expansion valve (EXV) having a drive motor 16a. The drive motor 16a may have a shaft which is movable to open or close an orifice defined in a valve body of the heating-side expansion valve 16, and the position of the shaft may be varied depending on the rotation direction thereof, rotation degree, and the like of the drive motor 16a, and thus the opening amount of the heating-side expansion valve 16 with respect to the orifice may be varied. A controller 100 may control the operation of the drive motor 16a. The heating-side expansion valve 16 may be a full open type EXV.

The opening amount of the heating-side expansion valve 16 may be varied by the controller 100. As the opening amount of the heating-side expansion valve 16 is varied, the flow rate of the refrigerant directed toward the third passage 73 may be varied. The heating-side expansion valve 16 may be controlled by the controller 100 during the heating operation of the HVAC subsystem 11.

Figure 3:
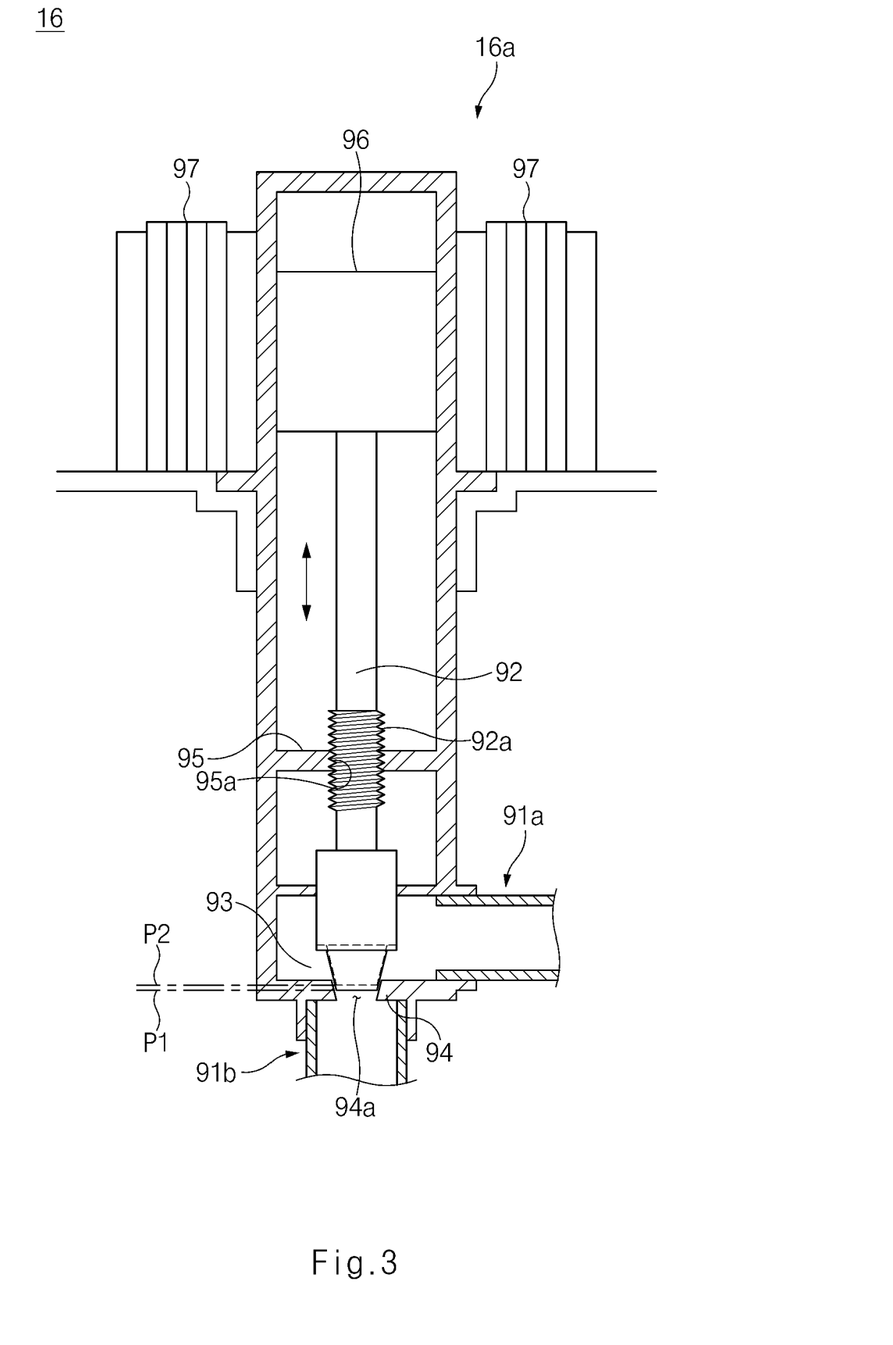
FIG. 3 illustrates a heating-side expansion valve applied to a vehicle thermal management system according to various exemplary embodiments of the present invention.

FIG. 3 illustrates an example of the heating-side expansion valve 16. Referring to FIG. 3, the heating-side expansion valve 16 may include a valve body 91 having an inlet 91*a* and an outlet 91*b*, a valve shaft 92 movably mounted in the valve body 91, a valve needle 93 provided on a bottom end portion of the valve shaft 92, and a valve seat 94 having an orifice 94*a*.

The valve body 91 may have a receiving space defined therein, and the valve shaft 92, the valve needle 93, and the valve seat 94 may be received in the space of the valve body 91. A nut 95 having internal threads 95*a* may be received in the space of the valve body 91, and the nut 95 may be fixed to an internal surface of the valve body 91.

The valve shaft 92 may include a permanent magnet 96 provided on a top end portion thereof and external threads 92*a* provided on a center portion thereof. The permanent magnet 96 may be rotated by the drive motor 16*a*. According to various exemplary embodiments of the present invention, the drive motor 16*a* may be a step motor having a plurality of stator coils 97. The external threads 92*a* may be threadedly engaged with the internal threads 95*a* of the nut 95. As the permanent magnet 96 is rotated by the drive motor 16*a*, the valve shaft 92 may rotate with the permanent magnet 96. As the valve shaft 92 rotates, the external threads 92*a* of the valve shaft 92 may move threadedly along the internal threads 95*a* of the nut 95, and thus the valve shaft 92 may move along an axis of the valve shaft 92 in the receiving space of the valve body 91. That is, the valve shaft 92 may move along its axis by the drive motor 16*a*, the external threads 92*a*, and the internal threads 95*a*.

An axis of the valve needle 93 may be aligned with an axis of the orifice 94*a* of the valve seat 94, and the valve seat 94 may be provided on a bottom end portion of the valve body 91. An edge portion of the orifice 94*a* may be tapered, and accordingly an external surface of the valve needle 93 may be tapered. As the valve shaft 92 moves in its axial direction thereof, the valve needle 93 may block or open the orifice 94*a* of the valve seat 94. As the position of the valve shaft 92 is adjusted, the position of the valve needle 93 may be varied, and accordingly the opening amount of the orifice 94*a* of the valve seat 94 may be varied. For example, when the valve shaft 92 and the valve needle 93 move away from the orifice 94*a* of the valve seat 94, the opening amount of the orifice 94*a* of the valve seat 94 may be relatively increased. When the valve shaft 92 and the valve needle 93 move close to the orifice 94*a* of the valve seat 94, the opening amount of the orifice 94*a* of the valve seat 94 may be relatively reduced.

The cooling-side expansion valve 15 may be disposed between the external heat exchanger 35 and the evaporator 31 in the refrigerant loop 21. As the cooling-side expansion valve 15 is located on the upstream side of the evaporator 31, it may adjust the flow direction thereof, flow rate, and the like of the refrigerant directed toward the evaporator 31. During the cooling operation of the HVAC subsystem 11, the cooling-side expansion valve 15 may be configured to expand the refrigerant received from the external heat exchanger 35.

According to various exemplary embodiments of the present invention, the cooling-side expansion valve 15 may be a thermal expansion valve (TXV) which detects the temperature and/or pressure of the refrigerant and adjusts the opening amount of the cooling-side expansion valve 15. The cooling-side expansion valve 15 may be a TXV having a shut-off valve 15*a* selectively blocking the flow of the refrigerant toward an internal passage of the cooling-side expansion valve 15, and the shut-off valve 15*a* may be a solenoid valve. The shut-off valve 15*a* may be opened or closed by the controller 100, blocking or unblocking the flow of the refrigerant toward the cooling-side expansion valve 15. As the shut-off valve 15*a* is opened, the refrigerant may be allowed to flow into the cooling-side expansion valve 15, and as the shut-off valve 15*a* is closed, the refrigerant may be blocked from flowing into the cooling-side expansion valve 15. According to various exemplary embodiments of the present invention, the shut-off valve 15*a* may be mounted in the inside of a valve body of the cooling-side expansion valve 15, opening or closing the internal passage of the cooling-side expansion valve 15. According to another exemplary embodiment of the present invention, the shut-off valve 15*a* may be located on the upstream side of the cooling-side expansion valve 15, selectively opening or closing an inlet of the cooling-side expansion valve 15.

When the shut-off valve 15*a* is closed, the cooling-side expansion valve 15 may be blocked, and accordingly the refrigerant may only be directed into the battery chiller 37 without flowing into the cooling-side expansion valve 15 and the evaporator 31. That is, when the shut-off valve 15*a* of the cooling-side expansion valve 15 is closed, the cooling operation of the HVAC subsystem 11 may not be performed, but only the battery chiller 37 may be cooled or the heating operation of the HVAC subsystem 11 may be performed. When the shut-off valve 15*a* is opened, the refrigerant may be directed into the cooling-side expansion valve 15 and the evaporator 31. That is, when the shut-off valve 15*a* of the cooling-side expansion valve 15 is opened, the cooling operation of the HVAC subsystem 11 may be performed.

The HVAC subsystem 11 may include a heating, ventilation, and air conditioning (HVAC) case 30 having an inlet and an outlet, and the HVAC case 30 may be configured to direct the air into the passenger compartment of the vehicle. The evaporator 31 and the internal condenser 33 may be located within the HVAC case 30. An air mixing door 34*a* may be disposed between the evaporator 31 and the internal condenser 33, and a positive temperature coefficient (PTC) heater 34*b* may be located on the downstream side of the internal condenser 33.

Figure 2:
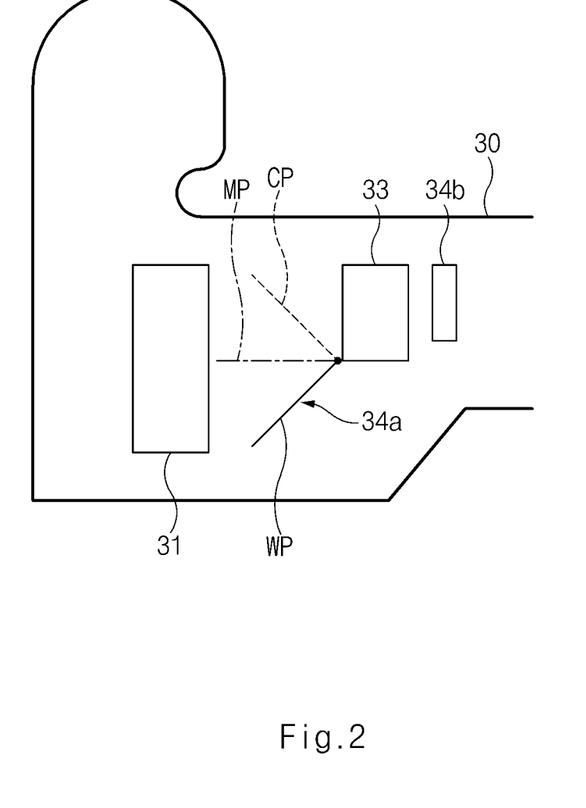
FIG. 2 illustrates a heating, ventilation, and air conditioning (HVAC) case applied to a vehicle thermal management system according to various exemplary embodiments of the present invention.

Referring to FIG. 2, the air mixing door 34*a* may move between a full heating position WP (see a solid line in FIG. 2) in which all air is directed toward the internal condenser 33, a full cooling position CP (see a dotted line in FIG. 2) in which all air is blocked from being directed toward the internal condenser 33, and a mix position MP (see a dashed-dotted line in FIG. 2) in which only a portion of the air is directed toward the internal condenser 33. When the air mixing door 34*a* is in the full heating position WP, all of the air directed into the HVAC case 30 through the inlet may pass through the evaporator 31 and be directed toward the internal condenser 33, and thus the air heated by the internal condenser 33 may be directed into the passenger compartment so that the passenger compartment may be fully heated. That is, when the air mixing door 34*a* is in the full heating position WP, the HVAC subsystem 11 may operate in a full heating mode. When the air mixing door 34*a* is in the full cooling position CP, all of the air directed into the HVAC case 30 through the inlet may pass through the evaporator 31 and be directly directed into the passenger compartment by bypassing the internal condenser 33, and thus the air cooled by the evaporator 31 may be directed into the passenger compartment so that the passenger compartment may be fully cooled. That is, the air mixing door 34*a* is in the full cooling position CP, the HVAC subsystem 11 may operate in a full cooling mode. When the air mixing door 34a is in the mix position MP, all of the air directed into the HVAC case 30 through the inlet may pass through the evaporator 31, and then a portion of the air may pass through the internal condenser 33 and the remaining portion of the air may bypass the internal condenser 33, and accordingly the air cooled by the evaporator 31 and the air heated by the internal condenser 33 may be mixed. Thus, the temperature of the air directed into the passenger compartment may be lowered appropriately. As the mixed air is directed into the passenger compartment, the temperature of the passenger compartment may be adjusted to an appropriate temperature between the full cooling mode and the full heating mode. That is, when the air mixing door 34a is in the mix position MP, the HVAC subsystem 11 may operate in a mix mode.

The HVAC subsystem 11 may further include an accumulator 38 disposed between the evaporator 31 and the compressor 32 in the refrigerant loop 21, and the accumulator 38 may be located on the downstream side of the evaporator 31. The accumulator 38 may separate a liquid refrigerant from the refrigerant which is received from the evaporator 31, preventing the liquid refrigerant from being directed toward the compressor 32.

The HVAC subsystem 11 may further include a branch conduit 36 branching off from the refrigerant loop 21. The branch conduit 36 may branch off from an upstream point of the cooling-side expansion valve 15 in the refrigerant loop 21 and be connected to the compressor 32. The battery chiller 37 may be fluidly connected to the branch conduit 36, and the battery chiller 37 may be configured to transfer heat between the branch conduit 36 and the battery coolant loop 22 to be described below. That is, the battery chiller 37 may transfer heat between the refrigerant circulating in the HVAC subsystem 11 and the coolant circulating in the battery cooling subsystem 12.

The battery chiller 37 may include a first passage 37a fluidly connected to the branch conduit 36 and a second passage 37b fluidly connected to the battery coolant loop 22. The first passage 37a and the second passage 37b may be adjacent to or contact each other within the battery chiller 37, and the first passage 37a may be fluidly separated from the second passage 37b. Accordingly, the battery chiller 37 may transfer heat between the coolant passing through the second passage 37b and the refrigerant passing through the first passage 37a. The branch conduit 36 may be fluidly connected to the accumulator 38, and the refrigerant passing through the branch conduit 36 may be received in the accumulator 38.

A chiller-side expansion valve 17 may be located on the upstream side of the battery chiller 37 in the branch conduit 36. The chiller-side expansion valve 17 may adjust the flow direction thereof, flow rate, and the like of the refrigerant directed toward the battery chiller 37, and the chiller-side expansion valve 17 may be configured to expand the refrigerant received from the external heat exchanger 35.

According to various exemplary embodiments of the present invention, the chiller-side expansion valve 17 may be an electronic expansion valve (EXV) having a drive motor 17a. The drive motor 17a may have a shaft which is movable to open or close an orifice defined in a valve body of the chiller-side expansion valve 17, and the position of the shaft may be varied depending on the rotation direction thereof, rotation degree, and the like of the drive motor 17a, and accordingly the opening amount of the chiller-side expansion valve 17 may be varied. That is, the controller 100 may control the operation of the drive motor 17a so that the opening amount of the chiller-side expansion valve 17 may be varied. The chiller-side expansion valve 17 may be a full open type EXV. The chiller-side expansion valve 17 may have a structure which is the same as or similar to that of the heating-side expansion valve 16 illustrated in FIG. 3.

As the opening amount of the chiller-side expansion valve 17 is varied, the flow rate of the refrigerant directed toward the battery chiller 37 may be varied. For example, when the opening amount of the chiller-side expansion valve 17 is greater than a reference opening amount, the flow rate of the refrigerant directed toward the battery chiller 37 may increase compared to a reference flow rate, and when the opening amount of the chiller-side expansion valve 17 is less than the reference opening amount, the flow rate of the refrigerant directed toward the battery chiller 37 may be similar to the reference flow rate or decrease compared to the reference flow rate. Here, the reference opening amount may be an opening amount of the chiller-side expansion valve 17 for maintaining a target evaporator temperature, and the reference flow rate may be a flow rate of the refrigerant directed toward the battery chiller 37 when the chiller-side expansion valve 17 is opened to the reference opening amount. In other words, when the chiller-side expansion valve 17 is opened to the reference opening amount, the refrigerant may be directed toward the battery chiller 37 at the corresponding reference flow rate.

As the opening amount of the chiller-side expansion valve 17 is adjusted by the controller 100, the flow rate of the refrigerant directed toward the battery chiller 37 may be varied, and accordingly the flow rate of the refrigerant directed toward the evaporator 31 may be varied. As the opening amount of the chiller-side expansion valve 17 is adjusted, the refrigerant may be distributed into the evaporator 31 and the battery chiller 37 at a predetermined rate, and thus the cooling of the HVAC subsystem 11 and the cooling of the battery chiller 37 may be performed simultaneously or selectively.

The HVAC subsystem 11 may further include a refrigerant bypass conduit 39 connecting a downstream point of the third passage 73 of the water-cooled heat exchanger 70 and the branch conduit 36. An inlet of the refrigerant bypass conduit 39 may be connected to the downstream point of the water-cooled heat exchanger 70, and an outlet of the refrigerant bypass conduit 39 may be connected to the branch conduit 36. The inlet of the refrigerant bypass conduit 39 may be connected to a point between the water-cooled heat exchanger 70 and the external heat exchanger 35, and the outlet of the refrigerant bypass conduit 39 may be connected to a point between the battery chiller 37 and the compressor 32 in the branch conduit 36. A first three-way valve 61 may be disposed at a junction between the inlet of the refrigerant bypass conduit 39 and the refrigerant loop 21. The first three-way valve 61 may be disposed between the external heat exchanger 35 and the water-cooled heat exchanger 70 in the refrigerant loop 21. When the first three-way valve 61 is switched to open the inlet of the refrigerant bypass conduit 39, the refrigerant passing through the third passage 73 of the water-cooled heat exchanger 70 may be directed toward the compressor 32 through the refrigerant bypass conduit 39 and the accumulator 38. That is, when the inlet of the refrigerant bypass conduit 39 is opened by the switching of the first three-way valve 61, the refrigerant may bypass the external heat exchanger 35. When the first three-way valve 61 is switched to close the inlet of the refrigerant bypass conduit 39, the refrigerant passing through the third passage 73 of the water-cooled heat exchanger 70 may not pass through the refrigerant bypass conduit 39, and be directed toward the external heat exchanger 35. That is, when the inlet of the refrigerant bypass conduit 39 is closed by the switching of the first three-way valve 61, the refrigerant may pass through the external heat exchanger 35.

The controller 100 may control respective operations of the shut-off valve 15a of the cooling-side expansion valve 15, the heating-side expansion valve 16, the chiller-side expansion valve 17, the compressor 32, and the like so that the overall operation of the HVAC subsystem 11 may be controlled by the controller 100. According to various exemplary embodiments of the present invention, the controller 100 may be a full automatic temperature control (FATC) system.

When the HVAC subsystem 11 operates in the cooling mode, the shut-off valve 15a of the cooling-side expansion valve 15 may be opened, and the refrigerant may sequentially circulate through the compressor 32, the internal condenser 33, the heating-side expansion valve 16, the third passage 73 of the water-cooled heat exchanger 70, the external heat exchanger 35, the cooling-side expansion valve 15, and the evaporator 31.

When the HVAC subsystem 11 operates in the heating mode, the shut-off valve 15a of the cooling-side expansion valve 15 may be closed, and the refrigerant may sequentially circulate through the compressor 32, the internal condenser 33, the heating-side expansion valve 16, the third passage 73 of the water-cooled heat exchanger 70, the external heat exchanger 35, the chiller-side expansion valve 17, the first passage 37a of the battery chiller 37, and the compressor 32. During the heating operation of the HVAC subsystem 11, when the shut-off valve 15a of the cooling-side expansion valve 15 is closed, and the inlet of the refrigerant bypass conduit 39 is opened by the switching of the first three-way valve 61, the refrigerant may sequentially circulate through the compressor 32, the internal condenser 33, the heating-side expansion valve 16, the third passage 73 of the water-cooled heat exchanger 70, and the compressor 32.

The battery cooling subsystem 12 may be configured to cool the battery pack 41 using the coolant circulating in the battery coolant loop 22. The battery coolant loop 22 may be fluidly connected to the battery pack 41, a heater 42, the battery chiller 37, a second circulation pump 45, a battery radiator 43, a reservoir tank 48, and a first circulation pump 44. In FIG. 1, the coolant may sequentially pass through the battery pack 41, the heater 42, the battery chiller 37, the second circulation pump 45, the battery radiator 43, the reservoir tank 48, the water-cooled heat exchanger 70, and the first circulation pump 44 through the battery coolant loop 22.

The battery pack 41 may have a coolant passage through which the coolant passes inside or outside the battery pack 41, and the battery coolant loop 22 may be fluidly connected to the coolant passage of the battery pack 41.

The heater 42 may be disposed between the battery chiller 37 and the battery pack 41, and the heater 42 may heat the coolant circulating through the battery coolant loop 22, warming-up the coolant. According to various exemplary embodiments of the present invention, the heater 42 may be a water-heating heater that heats the coolant by exchanging heat with a high-temperature fluid. According to another exemplary embodiment of the present invention, the heater 42 may be an electric heater.

The battery radiator 43 may be disposed adjacent to the front grille of the vehicle, and the battery radiator 43 may be cooled by the ambient air forcibly blown by the cooling fan 75. The battery radiator 43 may be adjacent to the external heat exchanger 35.

The first circulation pump 44 may allow the coolant to circulate through at least a portion of the battery coolant loop 22, and the second battery pump 45 may allow the coolant to circulate through at least a portion of the battery coolant loop 22.

The first circulation pump 44 may be disposed at an upstream point of the battery pack 41 in the battery coolant loop 22. The first circulation pump 44 may forcibly pump the battery coolant into the battery pack 41, allowing the battery coolant to pass through the battery pack 41.

The second circulation pump 45 may be disposed at an upstream point of the battery radiator 43 in the battery coolant loop 22. The second circulation pump 45 may forcibly pump the coolant into an inlet of the battery radiator 43, allowing the coolant to pass through the battery radiator 43.

The first circulation pump 44 and the second circulation pump 45 may operate individually and selectively according to the heating state and charging condition of the battery pack 41, the operation condition of the HVAC subsystem 11, and the like.

The reservoir tank 48 may be disposed between an outlet of the battery radiator 43 and an inlet of the first circulation pump 44.

The battery cooling subsystem 12 may further include a first battery bypass conduit 46 allowing the coolant to bypass the battery radiator 43. The first battery bypass conduit 46 may directly connect the upstream point of the battery radiator 43 and a downstream point of the battery radiator 43 in the battery coolant loop 22.

An inlet of the first battery bypass conduit 46 may be connected to a point between the battery chiller 37 and the inlet of the battery radiator 43 in the battery coolant loop 22. The inlet of the first battery bypass conduit 46 may be connected to a point between the battery chiller 37 and an inlet of the second circulation pump 45 in the battery coolant loop 22.

An outlet of the first battery bypass conduit 46 may be connected to a point between the battery chiller 37 and the outlet of the battery radiator 43 in the battery coolant loop 22. The outlet of the first battery bypass conduit 46 may be connected to a point between the inlet of the first circulation pump 44 and an outlet of the reservoir tank 48 in the battery coolant loop 22.

As the coolant flows from the downstream side of the battery chiller 37 to the upstream side of the first circulation pump 44 through the first battery bypass conduit 46, the coolant may bypass the second circulation pump 45, the battery radiator 43, the reservoir tank 48, and the water-cooled heat exchanger 70, and accordingly the coolant passing through the first battery bypass conduit 46 may sequentially circulate through the battery pack 41, the heater 42, and the battery chiller 37 by the first circulation pump 44.

The battery cooling subsystem 12 may further include a second battery bypass conduit 47 allowing the coolant to bypass the battery pack 41, the heater 42, and the battery chiller 37. The second battery bypass conduit 47 may directly connect a downstream point of the battery chiller 37 and the upstream point of the battery pack 41 in the battery coolant loop 22.

An inlet of the second battery bypass conduit 47 may be connected to a point between the outlet of the first battery bypass conduit 46 and the outlet of the battery radiator 43 in the battery coolant loop 22. The inlet of the second battery bypass conduit 47 may be connected to a point between the outlet of the first battery bypass conduit 46 and the outlet of the reservoir tank 48 in the battery coolant loop 22.

An outlet of the second battery bypass conduit 47 may be connected to a point between the inlet of the first battery bypass conduit 46 and the inlet of the battery radiator 43 in the battery coolant loop 22. The outlet of the second battery bypass conduit 47 may be connected to a point between the inlet of the first battery bypass conduit 46 and the inlet of the second circulation pump 45 in the battery coolant loop 22. As the coolant flows from the downstream side of the battery radiator 43 to the upstream side of the second circulation pump 45 through the second battery bypass conduit 47, the coolant may bypass the battery pack 41, the heater 42, and the battery chiller 37, and accordingly the coolant passing through the second battery bypass conduit 47 may sequentially circulate through the battery radiator 43, the reservoir tank 48, and the water-cooled heat exchanger 70 by the second circulation pump 45.

The first battery bypass conduit 46 and the second battery bypass conduit 47 may be parallel to each other.

The battery cooling subsystem 12 may further include a second three-way valve 62 disposed at the inlet of the first battery bypass conduit 46. That is, the second three-way valve 62 may be disposed at a junction between the inlet of the first battery bypass conduit 46 and the battery coolant loop 22. When the second three-way valve 62 is switched to open the inlet of the first battery bypass conduit 46, a portion of the coolant (from the battery chiller 37) may pass through the first battery bypass conduit 46 so that it may bypass the battery radiator 43, and the remaining coolant (from the battery radiator 43) may pass through the second battery bypass conduit 47 so that it may bypass the battery pack 41, the heater 42, and the battery chiller 37. That is, when the inlet of the first battery bypass conduit 46 is opened by the switching of the second three-way valve 62, the second three-way valve 62, the first battery bypass conduit 46, and the second battery bypass conduit 47 separate the battery coolant loop 22 into two independent circulation loops fluidly separated from each other. The coolant passing through the first battery bypass conduit 46 may bypass the second circulation pump 45, the battery radiator 43, the reservoir tank 48, and the water-cooled heat exchanger 70, and sequentially circulate through the battery pack 41, the heater 42, and the battery chiller 37 by the first circulation pump 44. The coolant passing through the second battery bypass conduit 47 may bypass the first circulation pump 44, the battery pack 41, the heater 42, and the battery chiller 37, and sequentially circulate through the battery radiator 43, the reservoir tank 48, and the water-cooled heat exchanger 70 by the second circulation pump 45.

When the second three-way valve 62 is switched to close the inlet of the first battery bypass conduit 46, the coolant may not pass through the first battery bypass conduit 46. That is, when the inlet of the first battery bypass conduit 46 is closed by the switching of the second three-way valve 62, the coolant may circulate through the battery coolant loop 22.

The battery cooling subsystem 12 may be controlled by a battery management system 110. The battery management system 110 may monitor the state of the battery pack 41, and perform the cooling of the battery pack 41 when the temperature of the battery pack 41 is higher than or equal to a predetermined temperature. The battery management system 110 may transmit an instruction for the cooling of the battery pack 41 to the controller 100, and accordingly the controller 100 may control the compressor 32 to activate and control the chiller-side expansion valve 17 to open. When the operation of the HVAC subsystem 11 is not required during the cooling operation of the battery pack 41, the controller 100 may control the cooling-side expansion valve 15 to close. Furthermore, the battery management system 110 may control the operation of the first circulation pump 44 and the switching of the second three-way valve 62 as necessary, so that the coolant may bypass the battery radiator 43 and circulate through the battery pack 41 and the battery chiller 37.

The powertrain cooling subsystem 13 may be configured to cool the electric motor 51 and the electric/electronic components 52 of the powertrain using the coolant circulating through the powertrain coolant loop 23. The powertrain coolant loop 23 may be fluidly connected to the electric motor 51, a powertrain radiator 53, a reservoir tank 56, a third circulation pump 54, and the electric/electronic components 52. In FIG. 1, the coolant may sequentially pass through the electric motor 51, the powertrain radiator 53, the reservoir tank 56, the third circulation pump 54, and the electric/electronic components 52 through the powertrain coolant loop 23.

The electric motor 51 may have a coolant passage through which the coolant passes inside or outside the electric motor 51, and the powertrain coolant loop 23 may be fluidly connected to the coolant passage of the electric motor 51.

The electric/electronic components 52 may be one or more electric/electronic components related to the driving of the electric motor 51, such as an inverter, an on-board charger (OBC), and a low DC-DC converter (LDC). The electric/electronic components 52 may have a coolant passage through which the coolant passes inside or outside the electric/electronic components 52, and the powertrain coolant loop 23 may be fluidly connected to the coolant passage of the electric/electronic components 52.

The powertrain radiator 53 may be disposed adjacent to the front grille of the vehicle, and the powertrain radiator 53 may be cooled by the ambient air forcibly blown by the cooling fan 75. The external heat exchanger 35, the battery radiator 43, and the powertrain radiator 53 may be disposed adjacent to each other on the front of the vehicle, and the cooling fan 75 may be disposed behind the external heat exchanger 35, the battery radiator 43, and the powertrain radiator 53.

The third circulation pump 54 may be located on the upstream side of the electric motor 51 and the electric/electronic components 52, and the third circulation pump 54 may allow the coolant to circulate in the powertrain coolant loop 23.

The powertrain cooling subsystem 13 may further include a powertrain bypass conduit 55 allowing the coolant to bypass the powertrain radiator 53. The powertrain bypass conduit 55 may directly connect an upstream point of the powertrain radiator 53 and a downstream point of the powertrain radiator 53 in the powertrain coolant loop 23 so that the coolant from an outlet of the electric motor 51 may be directed toward an inlet of the third circulation pump 54 through the powertrain bypass conduit 55, and thus the coolant may bypass the powertrain radiator 53.

An inlet of the powertrain bypass conduit 55 may be connected to a point between the electric motor 51 and the powertrain radiator 53 in the powertrain coolant loop 23. An outlet of the powertrain bypass conduit 55 may be connected to a point between the reservoir tank 56 and the electric/electronic components 52 in the powertrain coolant loop 23. The outlet of the powertrain bypass conduit 55 may be connected to a point between the reservoir tank 56 and the inlet of the third circulation pump 54 in the powertrain coolant loop 23.

The powertrain cooling subsystem 13 may further include a third three-way valve 63 disposed at the outlet of the powertrain bypass conduit 55. The coolant may bypass the powertrain radiator 53 through the powertrain bypass conduit 55 by the switching of the third three-way valve 63, and the coolant may sequentially pass through the electric motor 51, the third circulation pump 54, and the electric/electronic components 52.

The reservoir tank 56 may be located on the downstream side of the powertrain radiator 53. The reservoir tank 56 may be disposed between the powertrain radiator 53 and the third three-way valve 63 in the powertrain coolant loop 23.

In the powertrain cooling subsystem 13, the switching of the third three-way valve 63 and the operation of the third circulation pump 54 may be controlled by the controller 100.

The vehicle thermal management system according to various exemplary embodiments of the present invention may include an internal temperature sensor 81 measuring an internal temperature of the passenger compartment, an external temperature sensor or ambient temperature sensor 82 measuring an ambient temperature of the vehicle, and a solar radiation sensor 83 measuring a solar radiation quantity transferred to the vehicle.

The internal temperature sensor 81 may be disposed in the passenger compartment to measure the internal temperature in real time. The internal temperature measured by the internal temperature sensor 81 may be used for optimal control of the HVAC subsystem 11.

The ambient temperature sensor 81 may be disposed adjacent to the front grille of the vehicle to measure the ambient temperature of the vehicle, and the ambient temperature measured by the ambient temperature sensor 82 may be used for optimal control of the HVAC subsystem 11.

The solar radiation sensor 83 may be disposed on a front windshield or a roof of the vehicle to measure the solar radiation quantity transferred to the vehicle. The solar radiation quantity measured by the solar radiation sensor 83 may be used for optimal control of the HVAC subsystem 11.

The controller 100 may properly control the operations of the HVAC subsystem 11, the battery cooling subsystem 12, and the powertrain cooling subsystem 13 using the internal temperature sensor 81, the ambient temperature sensor 82, the solar radiation sensor 83, a humidity sensor, a high-pressure side pressure sensor, a low-pressure side pressure sensor, an evaporator temperature sensor, and the like.

Figure 4:
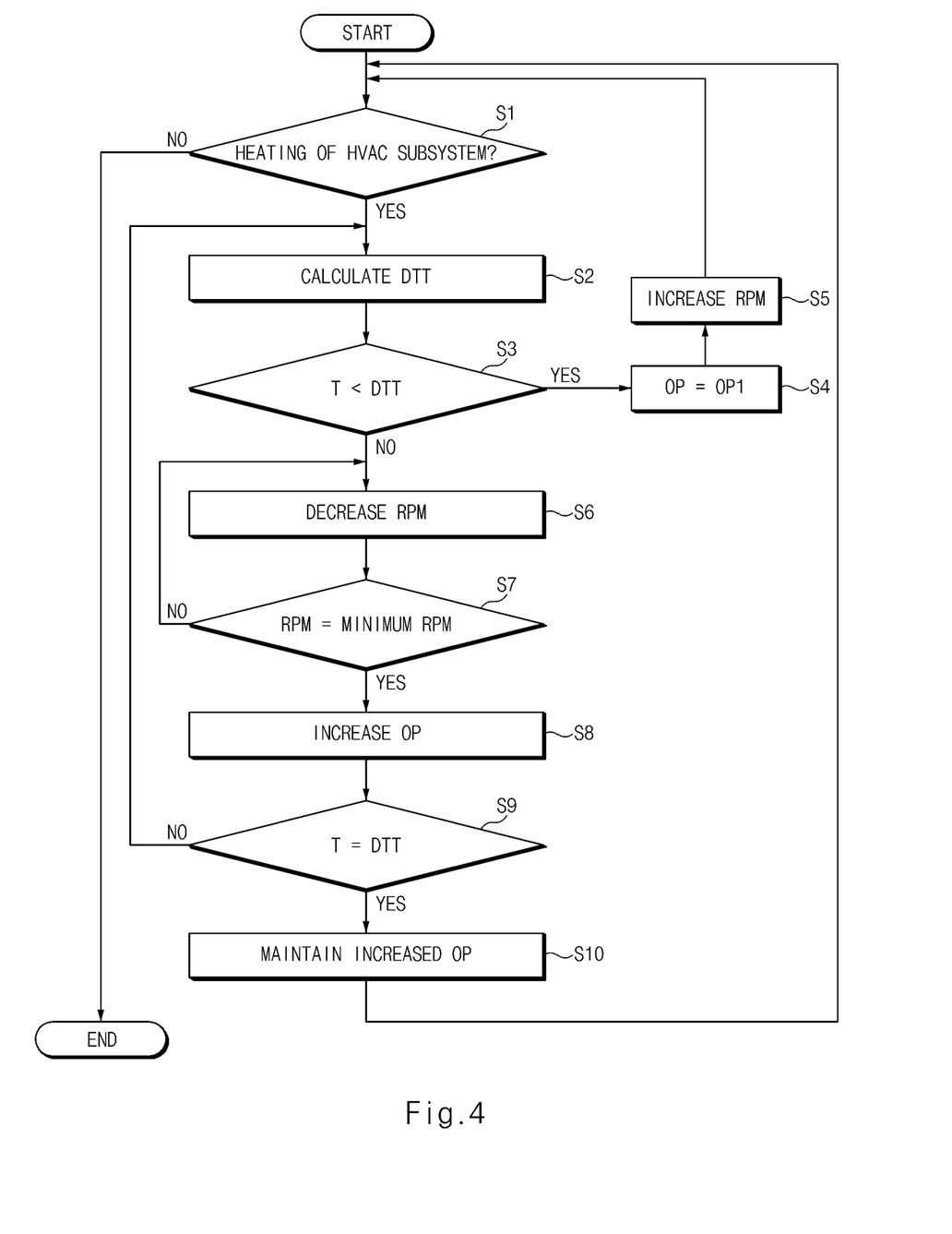
FIG. 4 illustrates a flowchart of a method for controlling heating of a vehicle thermal management system according to various exemplary embodiments of the present invention.

FIG. 4 illustrates a flowchart of a method for controlling heating of a vehicle thermal management system according to various exemplary embodiments of the present invention.

The controller 100 may determine whether the HVAC subsystem 11 operates in a heating mode (S1). When the HVAC subsystem 11 operates in the heating mode, the air mixing door 34a may be moved to the full heating position WP by the controller 100 so that the air heated by the internal condenser 33 may be directed into the passenger compartment. As the drive motor 16a of the heating-side expansion valve 16 is operated by the controller 100, the opening amount of the heating-side expansion valve 16 may be adjusted.

When it is determined that the HVAC subsystem 11 operates in the heating mode, the controller 100 may determine a desired target temperature DTT for heating the passenger compartment (S2). The controller 100 may determine the desired target temperature DTT using an internal temperature measured by the internal temperature sensor 81, an ambient temperature measured by the ambient temperature sensor 82, a solar radiation quantity measured by the solar radiation sensor 83, a heating temperature set by a user (an occupant), and the like. The desired target temperature DTT may be inversely proportional to the internal temperature, the ambient temperature, and the solar radiation quantity, and be proportional to the set heating temperature. The desired target temperature DTT may be determined in various ways depending on the internal and/or external conditions and driving condition of the vehicle, user settings, etc. The desired target temperature DTT may be determined using information from various sensors for the comfort of occupants.

For example, since the vehicle parked overnight in winter has a relatively very low temperature in the passenger compartment, the controller 100 may determine the desired target temperature DTT by setting the desired target temperature DTT higher than the occupant's set temperature. Furthermore, when the HVAC subsystem 11 is operating in the heating mode for a longer time period, the controller 100 may determine the desired target temperature DTT by setting the desired target temperature DTT lower than that in an initial heating period of the HVAC subsystem 11. Furthermore, when the solar radiation quantity is relatively high in a state in which the internal and/or external conditions, driving condition, and the like of the vehicle are similar or the same, the controller 100 may determine the desired target temperature DTT by relatively lowering the desired target temperature DTT.

When the HVAC subsystem 11 operates in the heating mode, the controller 100 may determine whether the internal temperature T measured by the internal temperature sensor 81 is lower than the desired target temperature DTT (S3).

When it is determined that the internal temperature T is lower than the desired target temperature DTT, an opening amount OP of the heating-side expansion valve 16 may be adjusted to a first opening amount OP1 (S4). Referring to FIG. 3, when the controller 100 controls the drive motor 16a to move the valve needle 93 to a first position P1, the heating-side expansion valve 16 may be opened to the first opening amount OP1. The first opening amount OP1 may be an opening amount of the heating-side expansion valve 16 with which a heat capacity for each RPM of the compressor 32 generated by the heating operation of the HVAC subsystem 11 reaches a maximum heat capacity. That is, in a state in which the heating-side expansion valve 16 is opened to the first opening amount OP1, the temperature of the internal condenser 33 of the HVAC subsystem 11 may become the highest temperature.

Figure 5:
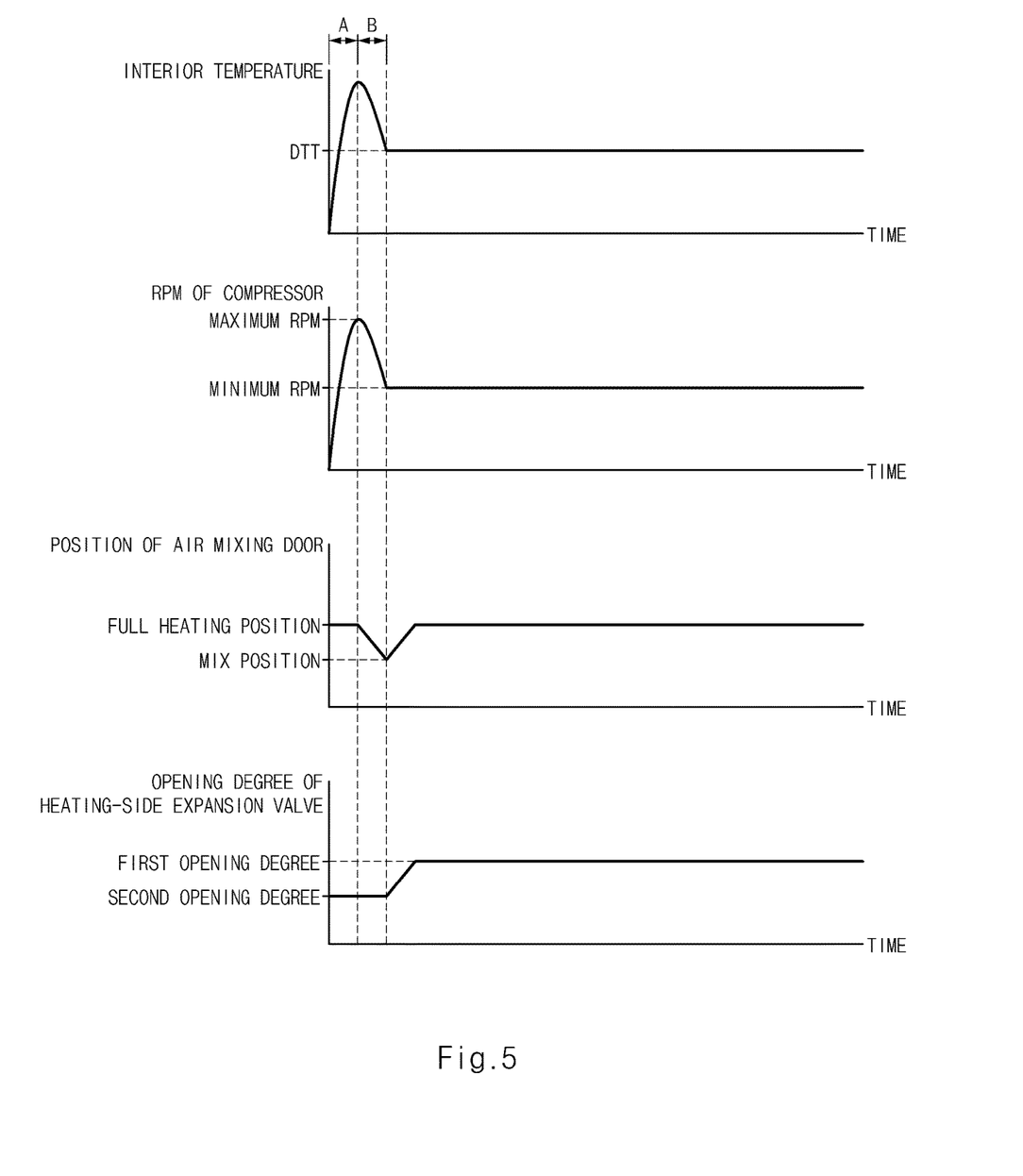
FIG. 5 illustrates a graph of interior temperature, RPM of a compressor, the position of an air mixing door, and the opening amount of a heating-side expansion valve when the method illustrated in FIG. 4 is performed by a heating, ventilation, and air conditioning (HVAC) subsystem in the vehicle thermal management system.

After the heating-side expansion valve 16 is opened to the first opening amount OP1, the controller 100 may increase RPM of the compressor 32 while maintaining the first opening amount OP1 of the heating-side expansion valve 16 (S5). Referring to portion one of FIG. 5, as the RPM of the compressor 32 increases, the internal temperature may increase. The internal temperature may exceed the desired target temperature DDT. After the RPM of the compressor 32 increases, the method may return to S1.

When it is determined in S3 that the internal temperature T is higher than or equal to the desired target temperature DTT (that is, the internal temperature reaches the desired target temperature DTT), the controller 100 may decrease the RPM of the compressor 32 (S6). Referring to part B of FIG. 5, as the RPM of the compressor 32 gradually decreases, the internal temperature may decrease. The internal temperature may be reduced to the desired target temperature DDT.

After decreasing the RPM of the compressor 32, the controller 100 may determine whether the RPM of the compressor 32 reaches a minimum RPM (S7). The minimum RPM may be RPM at which the flow rate of the refrigerant circulating through the refrigerant loop 21 of the HVAC subsystem 11 is maintained at a minimum flow rate.

Meanwhile, even when the compressor 32 operates at the minimum RPM, the HVAC subsystem 11 may continue to operate, and accordingly the internal temperature may exceed the desired target temperature DTT over time. When the internal temperature exceeds the desired target temperature DTT, the comfort of the passenger compartment may be relatively reduced. By taking the present into consideration, it may be necessary to relatively reduce the heat capacity generated by the heating operation of the HVAC subsystem 11 when the compressor 32 operates at the minimum RPM. Thus, the controller 100 may control the HVAC subsystem 11 to relatively reduce the heat capacity generated by the heating operation of the HVAC subsystem 11 while maintaining the minimum RPM of the compressor 32.

When it is determined in S7 that the RPM of the compressor 32 reaches the minimum RPM, the controller 100 may increase the opening amount OP of the heating-side expansion valve 16 (S8). When the compressor 32 operates at the minimum RPM, the controller 100 may control the drive motor 16a of the heating-side expansion valve 16 to increase the opening amount OP of the heating-side expansion valve 16 to a second opening amount OP2 greater than the first opening amount OP1. The second opening amount OP2 may be an opening amount of the heating-side expansion valve 16 with which the HVAC subsystem 11 prevents the internal temperature from exceeding the desired target temperature DDT. The second opening amount OP2 may be an opening amount of the heating-side expansion valve 16 with which a heat capacity for each RPM of the compressor 32 generated by the heating operation of the HVAC subsystem 11 reaches a minimum heat capacity, and thus the internal temperature may be prevented from excessively exceeding the desired target temperature DDT. For example, when the compressor 32 operates at the minimum RPM and the heating-side expansion valve 16 is opened to the second opening amount OP2, the internal temperature may increase within an allowable range around the desired target temperature DDT. The allowable range may be varied depending on the desired target temperature DDT, etc. For example, the allowable range may change in a range of 0.5° C.-1.5° C.

Referring to FIG. 3, when the controller 100 controls the drive motor 16a to move the valve needle 93 to a second position P2, the heating-side expansion valve 16 may be opened to the second opening amount OP2. When the heating-side expansion valve 16 is opened to the second opening amount OP2, the fluid resistance thereof may be lower than that when the heating-side expansion valve 16 is opened to the first opening amount OP1. Accordingly, internal energy of the refrigerant directed toward the inlet 91a of the valve body 91 of the heating-side expansion valve 16 may be relatively reduced. Since the inlet-side temperature of the heating-side expansion valve 16 is relatively low, the inlet-side pressure of the heating-side expansion valve 16 may be relatively low. Since an outlet of the compressor 32 communicates with the inlet of the heating-side expansion valve 16, a discharge pressure of the compressor 32 may be reduced when the inlet-side pressure of the heating-side expansion valve 16 is relatively low. Since the discharge pressure of the compressor 32 is relatively low, the work of the compressor 32 may be relatively reduced. Thus, the compressor 32 may consume relatively less power, and the heat capacity generated by the heating operation of the HVAC subsystem 11 may be relatively reduced.

After increasing the opening amount OP of the heating-side expansion valve 16, the controller 100 may determine whether the internal temperature is equal to the desired target temperature DTT (S9).

It may be determined in S9 that the internal temperature is equal to the desired target temperature DTT, the controller 100 may maintain the increased opening amount (that is, the second opening amount OP2) of the heating-side expansion valve 16 (S10), and then the method may return to S1.

It may be determined in S9 that the internal temperature is not equal to the desired target temperature DTT, the method may return to S3.

Meanwhile, according to various exemplary embodiments of the present invention, when the RPM of the compressor 32 increases in S5 and reaches a maximum RPM, it may be detected that the internal temperature T excessively rises above the desired target temperature DTT. When the RPM of the compressor 32 reaches the maximum RPM, the controller 100 may move the air mixing door 34a from the full heating position WP to the mix position MP. Here, the mix position MP may be a position in which the internal temperature T is reduced to the desired target temperature DTT by lowering the temperature of the air flowing from the HVAC subsystem 11 to the passenger compartment. As the air mixing door 34a is moved to the mix position MP, the internal temperature T may be rapidly dropped to the desired target temperature DTT.

Accordingly, the controller 100 may return the air mixing door 34a from the mix position MP to the full heating position WP when the RPM of the compressor 32 decreases and reaches the minimum RPM (S7) or the opening amount OP of the heating-side expansion valve 16 increases (S8). Thus, thermal energy generated by the HVAC subsystem 11 may be prevented from being wasted.

Figure 6:
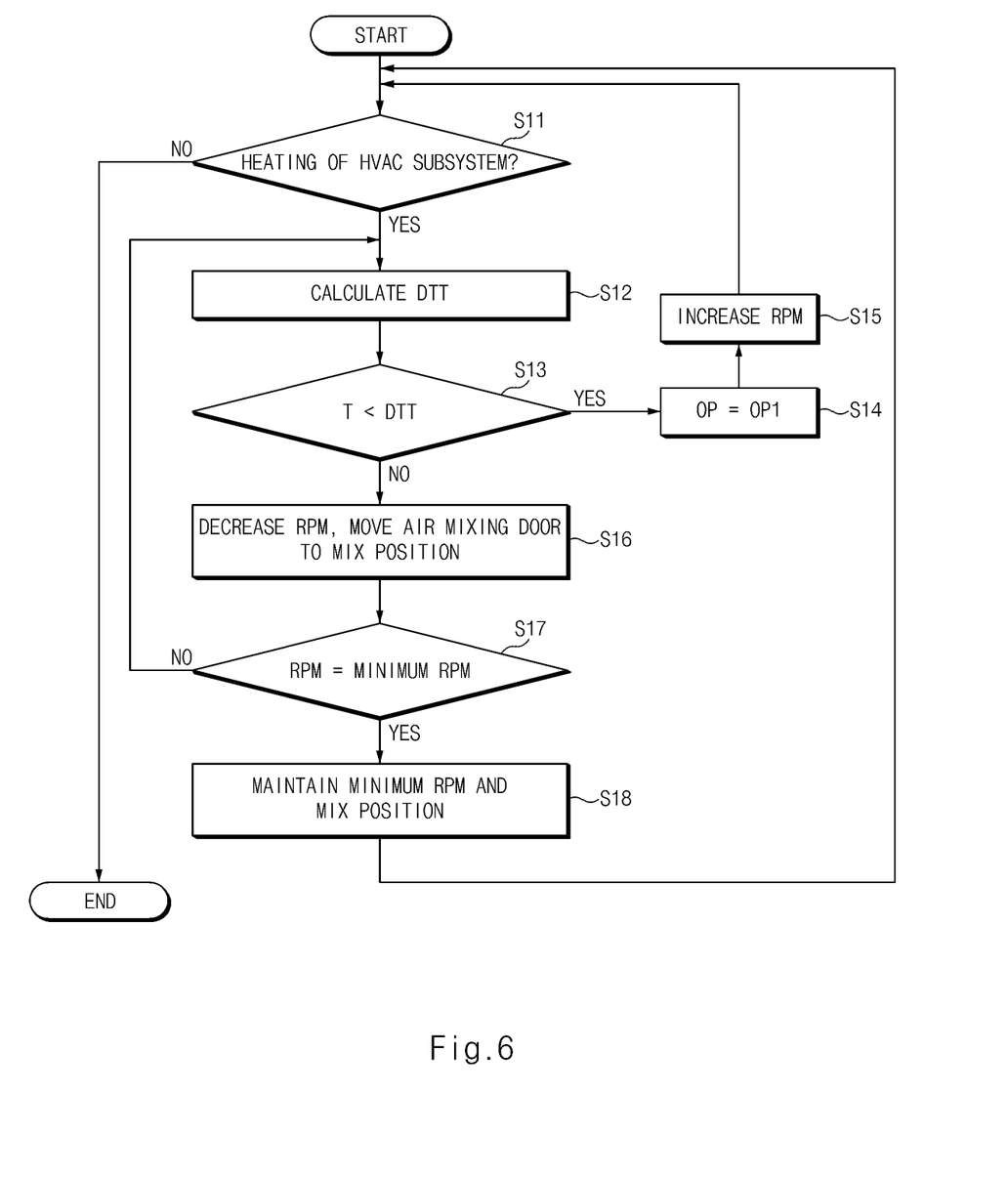
FIG. 6 illustrates a flowchart of a method for controlling heating of a vehicle thermal management system according to various exemplary embodiments of the present invention.

FIG. 6 illustrates a flowchart of a method for controlling heating of a vehicle thermal management system according to various exemplary embodiments of the present invention.

The controller 100 may determine whether the HVAC subsystem 11 operates in a heating mode (S11). When the HVAC subsystem 11 operates in the heating mode, the air mixing door 34a may be moved to the full heating position WP by the controller 100 so that the air heated by the internal condenser 33 may be directed into the passenger compartment. As the drive motor 16a of the heating-side expansion valve 16 is operated by the controller 100, the opening amount of the heating-side expansion valve 16 may be adjusted.

When it is determined that the HVAC subsystem 11 operates in the heating mode, the controller 100 may determine a desired target temperature DTT for heating the passenger compartment (S12). The controller 100 may determine the desired target temperature DTT using an internal temperature measured by the internal temperature sensor 81, an ambient temperature measured by the ambient temperature sensor 82, a solar radiation quantity measured by the solar radiation sensor 83, a heating temperature set by a user (an occupant), and the like. The desired target temperature DTT may be inversely proportional to the internal temperature, the ambient temperature, and the solar radiation quantity, and be proportional to the set heating temperature. The desired target temperature DTT may be determined in various ways depending on the internal and/or external conditions and driving condition of the vehicle, user settings, etc. The desired target temperature DTT may be determined using information from various sensors for the comfort of occupants.

For example, since the vehicle parked overnight in winter has a relatively very low temperature in the passenger compartment, the controller 100 may determine the desired target temperature DTT by setting the desired target temperature DTT higher than the occupant's set temperature. Furthermore, when the HVAC subsystem 11 is operating in the heating mode for a longer time period, the controller 100 may determine the desired target temperature DTT by setting the desired target temperature DTT lower than that in an initial heating period of the HVAC subsystem 11. Furthermore, when the solar radiation quantity is relatively high in a state in which the internal and/or external conditions, driving condition, and the like of the vehicle are the same, the controller 100 may determine the desired target temperature DTT by relatively lowering the desired target temperature DTT.

When the HVAC subsystem 11 operates in the heating mode, the controller 100 may determine whether the internal temperature T measured by the internal temperature sensor 81 is lower than the desired target temperature DTT (S13).

When it is determined that the internal temperature T is lower than the desired target temperature DTT, an opening amount OP of the heating-side expansion valve 16 may be adjusted to a first opening amount OP1 (S14). Referring to FIG. 3, when the controller 100 controls the drive motor 16a to move the valve needle 93 to the first position P1, the heating-side expansion valve 16 may be opened to the first opening amount OP1. The first opening amount OP1 may be an opening amount of the heating-side expansion valve 16 with which a heat capacity for each RPM of the compressor 32 generated by the heating operation of the HVAC subsystem 11 reaches a maximum heat capacity. That is, in a state in which the heating-side expansion valve 16 is opened to the first opening amount OP1, the temperature of the internal condenser 33 of the HVAC subsystem 11 may become the highest temperature.

After the heating-side expansion valve 16 is opened to the first opening amount OP1, the controller 100 may increase RPM of the compressor 32 (S15). Referring to part one of FIG. 7, as the RPM of the compressor 32 increases, the internal temperature may increase. The internal temperature may exceed the desired target temperature DDT. After the RPM of the compressor 32 increases, the method may return to S11.

When it is determined in S13 that the internal temperature T is higher than or equal to the desired target temperature DTT (that is, the internal temperature reaches the desired target temperature DTT), the controller 100 may decrease the RPM of the compressor 32, and move the air mixing door 34a from the full heating position WP to the mix position MP (S16).

Figure 7:
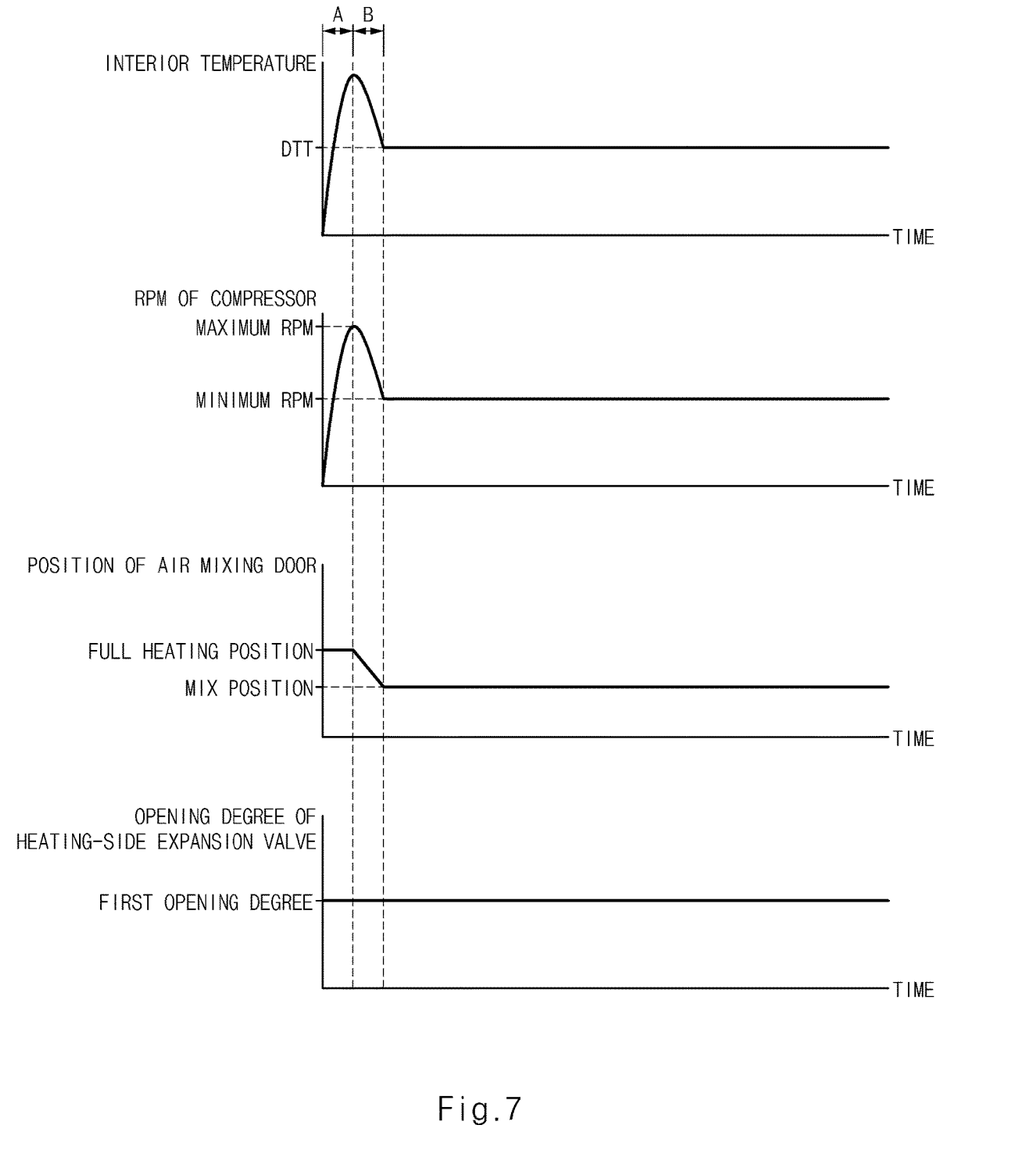
FIG. 7 illustrates a graph of interior temperature, RPM of a compressor, the position of an air mixing door, and the opening amount of a heating-side expansion valve when the method illustrated in FIG. 6 is performed by a heating, ventilation, and air conditioning (HVAC) subsystem in the vehicle thermal management system.

Referring to FIG. 7, as the RPM of the compressor 32 increases to a maximum RPM, it may be detected that the internal temperature T excessively rises above the desired target temperature DTT. When the RPM of the compressor 32 reaches the maximum RPM, the controller 100 may decrease the RPM of the compressor 32 to thereby reduce the heat capacity generated by the heating operation of the HVAC subsystem 11. The controller 100 may move the air mixing door 34a from the full heating position WP to the mix position MP. Here, the mix position MP may be a position in which the internal temperature T is reduced to the desired target temperature DTT by lowering the temperature of the air flowing from the HVAC subsystem 11 to the passenger compartment. Referring to part B of FIG. 7, as the RPM of the compressor 32 gradually decreases and the air mixing door 34a is moved to the mix position MP, the internal temperature may decrease. The internal temperature may be reduced to the desired target temperature DDT.

After S16, the controller 100 may determine whether the RPM of the compressor 32 reaches a minimum RPM (S17).

When it is determined in S17 that the RPM of the compressor 32 reaches the minimum RPM, the controller 100 may keep the air mixing door 34a in the mix position MP while maintaining the minimum RPM of the compressor 32 (S18). Here, the first opening amount OP1 of the heating-side expansion valve 16 may be kept constant. As the air mixing door 34a is maintained in the mix position MP, the temperature of the air heated by the internal condenser 33 of the HVAC subsystem 11 may be relatively lowered, and accordingly the internal temperature T may be kept constant at the desired target temperature DDT or be prevented from excessively exceeding the desired target temperature DDT. Accordingly, the method may return to S11.

As set forth above, according to exemplary embodiments of the present invention, when heating the passenger compartment of the vehicle, the vehicle thermal management system may keep the temperature of the passenger compartment constant at the desired target temperature or prevent the temperature of the passenger compartment from excessively exceeding the desired target temperature after the temperature of the passenger compartment reaches the desired target temperature, significantly improving the comfort of the passenger compartment and energy efficiency of the vehicle.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for controlling heating of a vehicle thermal management system including a heating, ventilation, and air conditioning (HVAC) subsystem, the method comprising:
   based on determining that the HVAC subsystem operates in a heating mode, determining, by a controller, a target temperature for heating a passenger compartment of a vehicle;
   determining, by the controller, whether an internal temperature of the passenger compartment is lower than the target temperature;
   based on determining that the internal temperature is lower than the target temperature, adjusting, by the controller, an opening amount of a heating-side expansion valve of the HVAC subsystem to a first opening amount;
   based on determining that the internal temperature is higher than or equal to the target temperature, decreasing, by the controller, revolutions per minute (RPM) of a compressor of the HVAC subsystem; and
   based on determining that the RPM of the compressor reaches a minimum RPM, increasing, by the controller, the opening amount of the heating-side expansion valve; and
   increasing, by the controller, the opening amount of the heating-side expansion valve to a second opening amount greater than the first opening amount,
   wherein the first opening amount is an opening amount of the heating-side expansion valve with which a heat capacity generated by a heating operation of the HVAC subsystem reaches a maximum heat capacity, and
   wherein the second opening amount is an opening amount of the heating-side expansion valve with which a heat capacity for each RPM of the compressor generated by the heating operation of the HVAC subsystem reaches a minimum heat capacity.

2. The method of claim 1, further including:
   based on determining that the internal temperature is lower than the target temperature, increasing, by the controller, the RPM of the compressor of the HVAC subsystem while maintaining the first opening amount of the heating-side expansion valve.

3. The method of claim 1, further including:
   based on determining that the internal temperature is equal to the target temperature, maintaining, by the controller, the second opening amount of the heating-side expansion valve.

4. The method of claim 1, further including:
   based on determining that the RPM of the compressor increases to a maximum RPM, moving, by the controller, an air mixing door of the HVAC subsystem from a full heating position to a mix position,
   wherein the full heating position is a position in which all air heated by the HVAC subsystem is directed into the passenger compartment, and
   wherein the mix position is a position in which the internal temperature is reduced to the target temperature by lowering a temperature of air flowing from the HVAC subsystem to the passenger compartment.

5. The method of claim 4, further including:
   based on determining that the RPM of the compressor decreases to the minimum RPM, returning, by the controller, the air mixing door from the mix position to the full heating position.

6. The method of claim 1, further including:
   based on determining that the RPM of the compressor increases to a maximum RPM, moving, by the controller, an air mixing door of the HVAC subsystem from a full heating position to a mix position while decreasing the RPM of the compressor,
   wherein the full heating position is a position in which all air heated by the HVAC subsystem is directed into the passenger compartment, and
   wherein the mix position is a position in which the internal temperature is reduced to the target temperature by lowering a temperature of air flowing from the HVAC subsystem to the passenger compartment.

7. The method of claim 6, further including:
   based on determining that the RPM of the compressor reaches the minimum RPM, keeping, by the controller, the air mixing door in the mix position and maintaining the minimum RPM of the compressor.

8. The method of claim 1, wherein the controller includes:
   a processor configured for executing a program for performing the method of claim 1; and
   a non-transitory storage medium configured for recording the program of performing the method of claim 1.

9. A non-transitory computer readable storage medium on which a program for performing the method of claim 1 is recorded.

* * * * *